United States Patent Office 3,814,717
Patented June 4, 1974

3,814,717
POLY(CARBOXYLIC ACID)-FLUOROALUMINO-
SILICATE GLASS SURGICAL CEMENT
Alan Donald Wilson and Brian Ernest Kent, both % The Dental Materials Section, Laboratory of the Government Chemist, Cornwall House, Stamford St., London SE. 1, England
No Drawing. Filed Dec. 4, 1970, Ser. No. 95,417
Int. Cl. A61k 5/00; C08f 29/34
U.S. Cl. 260—29.6 M                47 Claims

ABSTRACT OF THE DISCLOSURE

A surgical cement pack comprises as one component a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0, and as another component a surgically acceptable water soluble poly(carboxylic acid) having a relative viscosity of from 1.05 to 2.00.

The poly(carboxylic acid) is preferably in the form of an aqueous solution. On mixing the fluoroaluminosilicate glass powder and the aqueous solution of the poly(carboxylic acid) there is obtained a mass that remains plastic long enough to be formed into a desired shape prior to hardening as a surgical cement.

---

This invention relates to surgical cements and is particularly concerned with cements for use in dentistry.

The materials known as dental cements have many applications in dentistry including use as filling materials for restoring teeth and for cementing inlays and crowns into place in the tooth, providing a base and/or lining in a tooth cavity, providing a temporary fixing for the bonds of orthodontic appliances to the teeth and sealing root-canals after endodontic treatment. The traditional dental silicate cement, despite its faults, remains the principal material used for anterior restorations largely because no alternative system has yet proved better. Dental silicate cement is translucent so that it can be made to match tooth enamel, is resistant to abrasion, and has a high strength in compression. Its faults are that it irritates pulpal tissues, necessitating the use of a cavity liner, and that it is quickly eroded by acid attack in the mouth and also stains badly so that eventually it fails either by losing its aesthetic appearance or by disintegrating at the margins. Until now it has not proved possible to develop a dental cement, particularly for use as an anterior filling material, which is translucent, has high strength, is stain and acid resistant and sets within a few minutes.

The present invention provides an improved cement for dental and other surgical purposes which is prepared by reacting a fluoroaluminosilicate glass powder with a poly (carboxylic acid).

According to the invention a surgical cement pack comprises as one component a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0, and as another component a surgically acceptable water soluble poly(carboxylic acid) having a relative viscosity as hereinafter defined of from 1.05 to 2.00.

The invention also comprises a process for the preparation of a surgical cement which comprises mixing a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0 with a surgically acceptable water soluble poly(carboxylic acid) having a relative viscosity as hereinafter defined of from 1.05 to 2.00, in the presence of water, to give a mass that remains plastic long enough to be formed into a desired shape prior to hardening as a surgical cement.

In this specification relative viscosity is defined as the viscosity measured with a capillary viscometer of a 1% weight to volume solution of the poly(carboxylic acid) in twice molar sodium hydroxide solution at 25° C. relative to the viscosity of the twice molar sodium hydroxide solution.

Glasses of the foregoing composition are novel materials and are also part of the invention. They have been found to react with poly(carboxylic acids), and particularly with poly(carboxylic acids) containing acrylic acid units, to give cements having excellent properties. Surgical cement packs in accordance with this invention preferably comprise the poly(carboxylic acid) in the form of an aqueous solution containing from 20 to 60% by weight of the poly(carboxylic acid).

The pack may be a two part pack in which the weight ratio of powder to solution in the two parts is preferably from 0.5:1 to 5:1 so that when the entire contents of the two parts are mixed together the rapidly hardening plastic mass is obtained. In another embodiment the pack may contain the powder in separate capsules, the total amount of powder in the pack and the total amount of liquid in the pack being in the desired ratio. In a further embodiment both components may be encapsulated in the same capsule, in the desired ratio, provided that steps are taken to prevent premature reaction. In a still further embodiment the pack may be a one part pack containing an intimately blended mixture of the glass powder and solid water soluble poly(carboxylic acid) in the ratio of 1:1 to 10:1 which can be mixed with water to produce the cement. The mixed powder and the water may be contained in the same capsules provided steps are taken to prevent premature reaction, for example by dividing the capsule. This latter procedure generally requires some form of mechanical mixing.

In the above-mentioned embodiments the glass powder is from 15 to 85% by weight, the poly(carboxylic acid) is from 3 to 50% by weight, and the water is from 5 to 70% by weight, of the total composition.

It is found that when the two components are mixed together a plastic mass is obtained which sets rapidly in the mouth (1.5–10 minutes following completion of preparation).

The fluoroaluminosilicate glass powders used in this invention are decomposed by mineral acids, for example, hydrochloric acid and differ from conventional dental silicate cement powders in having different element ratios. They also differ from the conventional silicate cement powder in being considerably more reactive towards poly (carboxylic acid). Conventional silicate powders cannot be used with a poly(carboxylic acid) to form an acceptable dental cement because the low reactivity of the powder component causes the setting time to be too long.

The fluoroaluminosilicate glasses may be prepared by fusing mixtures of silica ($SiO_2$), alumina ($Al_2O_3$), cryolite ($Na_3AlF_6$) and fluorite ($CaF_2$) in the appropriate proportions at temperatures of 950° C. The preferred fusion temperatures are in the range of 1050 to 1350° C. After fusion the glass may be poured off and cooled rapidly, for example, in air or water or some combination of both. To a first approximation, the proportions of the different elements in the glass may be taken as the proportions of the same elements present in the mixture. Some fluorine may however be lost during the reaction, for example, up to 20% by weight, and an allowance should be made for this in deciding the proportions of the reactants in the mix.

Preferred mixtures for forming glasses according to the invention have a ratio by weight of silica to alumina of from 1.5 to 2.0 and a ratio by weight of fluorine to alumina of 1.0 to 2.5, or a ratio by weight of silica to alumina of from 0.5 to 1.5 and a ratio by weight of fluorine to alumina of from 0.5 to 2.0. The fluorine loss is dependent on the time for which the glass is held at the fusion temperature. For minimum loss of fluorine the glass should be heated for as short a time as possible. Heating times of from 30 to 120 minutes are preferred.

The actual content of fluorine in the glass can be determined by the method of A. C. D. Newman in Analyst, 1968, vol. 93, p. 827. It is not necessary to determine the amounts of alumina and silica in the glass since no appreciable loss of these components occurs during the reaction. Accordingly the amounts quoted for silica and alumina in the glasses of the invention refer to the amounts of silica ($SiO_2$) and alumina ($Al_2O_3$) in the mixture prior to the fusion reaction. Various alterations to the composition of the fluoroaluminosilicate glasses may be made within the content of the present invention, for example, aluminium fluoride ($AlF_3$) and aluminium phosphate ($AlPO_4$) may often advantageously be added to the mixture. A weight ratio of aluminium fluoride to alumina in the mixture is preferably from 0 to 1.0 and that of aluminium phosphate to alumina is preferably from 0 to 1.0. Fluorite may be partially or wholly replaced by lanthanum fluoride ($LaF_3$) magnesium fluoride, or both. Alumina may be partially replaced by another Group III metal oxide, titanium dioxide or zirconium dioxide. Cryolite may be wholly or partially replaced by mixtures of lithium fluoride and aluminium fluoride. Two preferred groups of fluoroaluminosilicate glasses suitable for use in the present invention have been prepared by fusing mixtures having the following compositions, expressed as parts per 100 parts of alumina ($Al_2O_3$).

|  | I | II |
|---|---|---|
| $Al_2O_3$ | 100 | 100 |
| $SiO_2$ | 160–190 | 75–100 |
| Total metal fluorides calculated as fluorine | 105–150 | 50–150 |
| $AlF_3$ | 0–100 | 0–100 |
| $AlPO_4$ | 0–125 | 0–125 |
| $Na_3AlF_6$ | 0–150 | 50–100 |

Suitable mixtures of particular use for preparing such glass compositions are as follows.

|  | I | II | III | IV | V | VI | VII | VIII | IX | X | XI |
|---|---|---|---|---|---|---|---|---|---|---|---|
| $SiO_2$ | 176 | 176 | 175 | 175 | 175 | 176 | 95 | 95 | 95 | 95 | 95 |
| $Al_2O_3$ | 100 | 100 | 100 | 100 | 100 | 90 | 100 | 100 | 100 | 100 | 100 |
| $TiO_2$ |  |  |  |  |  | 10 |  |  |  |  |  |
| $Na_3AlF_6$ | 135 | 135 |  | 30 | 65 | 135 | 76 | 76 | 76 | 76 | 76 |
| $CaF_2$ | 87 | 87 | 240 | 207 | 168 | 87 | 56 | 56 | 56 |  |  |
| $MgF_2$ |  |  |  |  |  |  |  |  |  | 45 |  |
| $LaF_3$ |  |  |  |  |  |  |  |  |  |  | 94 |
| $AlF_3$ | 32 | 32 | 32 | 32 | 32 | 32 |  |  | 96 | 96 |  |
| $AlPO_4$ | 56 | 100 | 60 | 60 | 60 | 56 | 73 | 121 | 73 | 73 | 73 |

The degree of fineness of the powder should be such that it produces a smooth cement paste which sets within a clinically acceptable period when mixed with the chosen liquid. Preferably the degree of fineness of the powder is such that it should pass through a 150 mesh B.S. sieve, and most preferably such that it passes through a 350 mesh B.S. sieve.

The surgically acceptable water soluble poly(carboxylic acid) has a relative viscosity as hereinbefore defined of from 1.05 to 2.0, and it is generally found that the above relative viscosity range corresponds to an average molecular weight of from 1500 to 150,000 when determined by the method of Sakamoto (Chem. Abstr., 58, 13160c).

The preferred poly(carboxylic acids) are those prepared by the homo-polymerization and co-polymerization of unsaturated aliphatic carboxylic acids and co-polymerization of these acids with other unsaturated aliphatic monomers, for example, acrylamide and acrylonitrile. Particularly preferred are the homo-polymers and co-polymers of acrylic acid. Although poly(carboxylic acids) having a relative viscosity of from 1.05 to 2.0 are readily water soluble, the choice of concentration and molecular weight should be such as to make a solution which is not too viscous since otherwise "cobwebbing" may become a problem when the desired quantity of solution is removed from its container and mixed with the glass powder. For good cement formation a preferred concentration range is from 40 to 55% by weight and a preferred relative viscosity range is from 1.10 to 1.60. Particularly preferred cements may be produced using from 44 to 52% concentrations of a polyacrylic acid with a relative viscosity of from 1.20 to 1.30. It is noteworthy, when selecting suitable combinations of concentration and molecular weight, that stronger solutions of any particular polymer are more difficult to mix and weaker solutions give lower cement strengths.

The cements of this invention are designed to be made by the practitioner immediately prior to use as in the conventional manner. Thus, the materials in the one or two part pack are brought together and mixed forming a plastic mass which can be cast, moulded or otherwise formed into the required shape during the brief period in which the mixture retains its plastic properties. For example, a quantity of poly(carboxylic acid) solution sufficient to make up one small batch of cement may be easily withdrawn from its container using a dental spatula or similar instrument or extruded from a tube or like container and this may be mixed with a quantity of the glass powder on a suitable surface. The components can be mixed quite rapidly to give a uniform mass which commences to harden within a few minutes and is usually set within 10 minutes of mixing.

In addition to the other parameters mentioned above, the rate of hardening and strength of final product, are determined by the powder/liquid ratio which is preferably as high as possible compatible with adequate working time. The optimum ratio for a particular powder and liquid may be determined readily by preliminary experiments. Too little or too much powder normally results in a mixture that is more difficult to form into a desired shape. Particularly good results have been obtained with powder/liquid ratios in the range 2 to 3:1. Careful matching of the powder and liquid components will enable an acceptable plastic mass to be obtained which will harden in an acceptable time.

The poly(carboxylic acid) solution which is used in the preferred method of carrying out the invention may be prepared by any of the customarily used polymerization techniques. For example, polymerization may be carried out in aqueous solution in the presence of ammonium persulphate and various chain transfer agents to give solutions containing up to about 30% of the polymer. This solution may then be concentrated, if necessary, to give a more viscous solution, or freeze-dried to give a solid particulate poly(carboxylic acid).

Various other acrylic monomers may be included in the polymerizing system to give carboxylic acid co-polymers having modified properties, provided that the carboxylic acid copolymer is sufficiently soluble in water and reacts with a fluoroaluminosilicate glass powder in the required manner.

The invention is illustrated by the following examples.

EXAMPLE 1

The following components are mixed by milling and then heated in a sillimanite crucible at 1100° C. until homogeneous (about 2 hours).

|  | G. |
|---|---|
| $SiO_2$ | 1000 |
| $Al_2O_3$ | 618 |
| $Na_3AlF_6$ | 730 |
| $AlPO_4$ | 303 |
| $CaF_2$ | 470 |
| $AlF_3$ | 174 |

The resultant opal glass is cooled rapidly and dried, then crushed until a sample, when mixed with a 45% aqueous polyacrylic acid solution (relative viscovity 1.24) at a powder/liquid weight ratio of 3.1:1, gives a setting time of 3½–4½ minutes. Mixing is by spatulation on a glass block.

A quantity of cement is prepared by mixing the crushed glass with a 45% w./w. aqueous solution of polyacrylic acid (relative viscosity 1.24) at a powder/liquid ratio of 3.1:1. The properties of the cement are as follows:

(a) Setting time 3¾ minutes (determined using a 1 lb. Gilmore needle, at 37 °C.).

(b) Compressive strength developed after 24 hrs. at 37°, 15,450 p.s.i.

(c) Acid resistance.—The surface of the cement, after 24 hrs. initial protection, remains glossy and smoothly intact after 24 hrs. in acid solution (pH=4.0). A conventional silicate treated similarly becomes matt and powdery.

(d) Stain resistance.—The cement shows much greater resistance to staining by tea liquor, which is a typical example of a naturally occurring stain-producing body, than does a conventional silicate cement.

EXAMPLE 2

The following compounds are mixed by milling and then heated in a sillimanite crucible at 1150° C. until homogeneous (about 2 hours).

|  | G. |
|---|---|
| $SiO_2$ | 175 |
| $Al_2O_3$ | 100 |
| $Na_3AlF_6$ | 30 |
| $AlPO_4$ | 60 |
| $CaF_2$ | 207 |
| $AlF_3$ | 32 |

The opal glass is prepared as described in Example 1 and crushed until it passes through a 350 mesh B.S. sieve. The glass is found to have a fluorine content of 21.6% (theoretical 22.8% assuming no loss of fluorine in reaction).

A cement is prepared by mixing the crushed glass with a 50% w./w. aqueous solution of polyacrylic acid (relative viscosity 1.34) at a powder/liquid ratio of 3:1. The properties of the cement are as follows:

(a) Setting time 4¾ minutes (using a 1 lb. Gilmore needle, at 37° C.).

(b) Compressive strength developed after 24 hrs. at 37° C., 27,500 p.s.i.

The acid resistance and stain resistance were similar to those of the cement of Example 1.

EXAMPLE 3

The following components are mixed by milling and then heated in a sillimanite crucible at 1100 °C. for 2 hours.

|  | G. |
|---|---|
| $SiO_2$ | 176 |
| $Al_2O_3$ | 100 |
| $Na_3AlF_6$ | 135 |
| $AlPO_4$ | 56 |
| $AlF_3$ | 32 |
| $CaF_2$ | 87 |

The resultant opal glass is prepared as described in Example 1 and crushed until it passes through a 350 mesh B.S. sieve. The glass is found to have a fluorine content of 21.5%, $F/Al_2O_3$ ratio 1.26 (theoretical 23.4%. $F/Al_2O_3$ ratio 1.38 assuming no loss of fluorine in reaction).

A quantity of cement is prepared by mixing the powdered glass with a 41% w./w. aqueous solution of polyacrylic acid (relative viscosity 1.24) at a powder/liquid ratio of 3:1.

The properties of the cement are as follows:

(a) Setting time 3¼ minutes (using 1 lb. Gilmore needle at 37° C.).

(b) Compressive strength developed after 24 hours at 37° C., 22,000 p.s.i.

The acid resistance and stain resistance were similar to those of the cement of Example 1.

EXAMPLE 4

The following components are mixed by milling and then heated in a sillimanite crucible at 1200° C. for 2 hours.

|  | G. |
|---|---|
| $SiO_2$ | 95 |
| $Al_2O_3$ | 100 |
| $Na_2AlF_6$ | 76 |
| $CaF_2$ | 56 |
| $AlPO_4$ | 73 |

The resultant opal glass is prepared as described in Example 1 and crushed until it passes through a 350 mesh B.S. sieve. The glass is found to have a fluorine content of 16.2% (theoretical 17% assuming no loss of fluorine in the reaction).

A quantity of cement is prepared by mixing the powdered glass with a 50% w./w. aqueous solution of polyacrylic acid (relative viscosity 1.24) at a powder/liquid ratio of 2:1.

The properties of the cement are as follows:

(a) Setting time 3¼ minutes (using 1 lb. Gilmore needle at 37° C.).

(b) Compressive strength developed after 24 hours at 37° C., 23,700 p.s.i.

The acid resistance and stain resistance were similar to those of the cement of Example 1.

EXAMPLE 5

This example describes the production of a dental cement using a glass powder according to the invention and a co-polymer of acrylic acid and acrylamide.

200 ml. of water and 2.5 g. of ammonium persulphate are placed in a flask, heated to 80–84° C. and degassed continuously with nitrogen. The following solutions are added over a period of 2 hours:

(a)

| Redistilled acrylic acid | ml | 80 |
|---|---|---|
| Acrylamide | g | 20 |
| Water | ml | 100 |
| Isopropanol | ml | 20 |

(b)

| Water | ml | 60 |
|---|---|---|
| Ammonium persulphate | g | 2.5 |

After complete addition the liquid is maintained at 80–85° C. with nitrogen purging for a further two hours. The liquid is then concentrated to 41% of polymerized acrylic acid or 51% total solids. The co-polymer is found to have a relative viscosity of 1.26.

The concentrated liquid when mixed with the glass powder of Example 2 in a weight ratio of 3:1 is found to give a dental cement having good physical properties.

EXAMPLE 6

The procedure of Example 5 is repeated using 20 g. of acrylonitrile in place of the acrylamide. The solution is concentrated to 46–47% polymerized acrylic acid or 58% total solids. The co-polymer is found to have a relative viscosity of 1.26.

The concentrated liquid when mixed with the glass powder of Example 2 in a weight ratio of 3:1 is found to give a dental cement having good physical properties.

We claim:

1. A surgical cement pack comprising as one component a fluoroaluminosilicate glass powder, and as another component a surgically acceptable water-soluble poly (carboxylic acid) having a relative viscosity as hereinbefore defined of from 1.05 to 2.00, the fluoroaluminosilicate glass having been prepared by fusing a mixture having the following composition expressed as parts per 100 parts of alumina ($Al_2O_3$):

| | |
|---|---|
| $Al_2O_3$ | 100 |
| $SiO_2$ | 160–190 |
| Total metal fluorides calculated as fluorine | 105–150 |
| $AlF_3$ | 0–100 |
| $AlPO_4$ | 0–125 |
| $Na_3AlF_6$ | 0–150 | said pack comprising from 15 to 85% by weight of the fluoroaluminosilicate glass powder, from 3 to 50% by weight of the poly(carboxylic acid) and from 5 to 70% by weight of water, based on the total weight of the components.

2. A surgical cement pack according to claim 1, in which the poly(carboxylic acid) is in the form of an aqueous solution containing from 20 to 60% by weight of the poly(carboxylic acid).

3. A surgical cement pack according to claim 1, in which the poly(carboxylic acid) solution contains from 40 to 55% by weight of the poly(carboxylic acid).

4. A surgical cement pack according to claim 1, in which the poly(carboxylic acid) has a relative viscosity as hereinbefore defined of from 1.10 to 1.60.

5. A surgical cement pack according to claim 2, in which the weight ratio of powder to solution is from 0.5:1 to 5:1.

6. A surgical cement pack according to claim 1, in which the degree of fineness of the glass powder is such that it passes through a 150 mesh B.S. sieve.

7. A surgical cement pack according to claim 1, in which the poly(carboxylic acid) is polyacrylic acid.

8. A surgical cement pack comprising as one component a fluoroaluminosilicate glass powder, and as another component a surgically acceptable water-soluble poly (carboxylic acid) having a relative viscosity as hereinbefore defined of from 1.05 to 2.00, the fluoroaluminosilicate glass having been prepared by fusing a mixture having the following composition expressed as parts per 100 parts of alumina ($Al_2O_3$):

| | |
|---|---|
| $Al_2O_3$ | 100 |
| $SiO_2$ | 75–100 |
| Total metal fluorides calculated as fluorine | 50–150 |
| $AlF_3$ | 0–100 |
| $AlPO_4$ | 0–125 |
| $Na_3AlF_6$ | 50–100 | said pack comprising from 15 to 85% by weight of the fluoroaluminosilicate glass powder, from 3 to 50% by weight of the poly(carboxylic acid) and from 5 to 70% by weight of water, based on the total weight of the components.

9. A surgical cement pack according to claim 8, in which the poly(carboxylic acid) is in the form of an aqueous solution containing from 20 to 60% by weight of the poly(carboxylic acid).

10. A surgical cement pack according to claim 9, in which the poly(carboxylic acid) solution contains from 40 to 55% by weight of the poly(carboxylic acid).

11. A surgical cement pack according to claim 8, in which the poly(carboxylic acid) has a relative viscosity as hereinbefore defined of from 1.10 to 1.60.

12. A surgical cement pack according to claim 9, in which the weight ratio of powder to solution is from 0.5:1 to 5:1.

13. A surgical cement pack according to claim 8, in which the degree of fineness of the glass powder is such that it passes through a 150 mesh B.S. sieve.

14. A surgical cement pack according to claim 8, in which the poly(carboxylic acid) is polyacrylic acid.

15. A surgical cement pack comprising as one component a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0, and as another component a surgically acceptable water-soluble poly(carboxylic acid) having a relative viscosity as hereinbefore defined of from 1.05 to 2.00, the two components being in the form of an intimate mixture of said fluoroaluminosilicate glass powder and said poly(carboxylic acid) in the weight ratio of glass powder to poly(carboxylic acid) of from 1:1 to 10:1, said mixture being capable of forming a surgical cement upon addition of water thereto.

16. A surgical cement pack according to claim 15, in which the poly(carboxylic acid) has a relative viscosity as hereinbefore defined of from 1.10 to 1.60.

17. A surgical cement pack according to claim 15, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 160–190 |
| Total metal fluorides calculated as fluorine | 105–150 |
| $AlF_3$ | 0–100 |
| $AlPO_4$ | 0–125 |
| $Na_3AlF_6$ | 0–150 |

18. A surgical cement pack according to claim 15, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 75–100 |
| Total metal fluorides calculated as fluorine | 50–150 |
| $AlF_3$ | 0–100 |
| $AlPO_4$ | 0–125 |
| $Na_3AlF_6$ | 50–100 |

19. A surgical cement pack according to claim 15, in which the degree of fineness of the glass powder is such that it passes through a 150 mesh B.S. sieve.

20. A surgical cement pack according to claim 15, in which the poly(carboxylic acid) is polyacrylic acid.

21. A surgical cement pack comprising a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0, a surgically acceptable water-soluble poly (carboxylic acid) having a relative viscosity as hereinbefore defined of from 1.05 to 2.00, and water; the pack having means to prevent premature reaction between the glass powder, poly(carboxylic acid) and water; said pack containing 0.5 to 5 parts by weight of glass powder per part by weight of the total weight of the poly(carboxylic acid) and water, whereby when the glass powder, poly (carboxylic acid) and water in the pack are mixed together a plastic mass is formed which rapidly hardens as a surgical cement but which remains plastic long enough to be formed into a desired shape.

22. A surgical cement pack according to claim 21, in which there is from 15 to 85% by weight of the fluoroaluminosilicate glass powder, from 3 to 50% by weight of the poly(carboxylic acid) and from 5 to 70% by weight of water, all based on the total weight of the glass powder, poly(carboxylic acid) and water.

23. A surgical cement pack according to claim 21, in which the poly(carboxylic acid) has a relative viscosity as hereinbefore defined of from 1.10 to 1.60.

24. A surgical cement pack according to claim 21, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 160–190 |
| Total metal fluorides calculated as fluorine | 105–150 |
| $AlF_3$ | 0–100 |
| $AlPO_4$ | 0–125 |
| $Na_3AlF_6$ | 0–150 |

25. A surgical cement pack according to claim 21, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 75–100 |
| Total metal fluorides calculated as fluorine | 50–150 |
| $AlF_3$ | 0–100 |
| $AlPO_4$ | 0–125 |
| $Na_3AlF_6$ | 50–100 |

26. A surgical cement pack according to claim 21, in which the degree of fineness of the glass powder is such that it passes through a 150 mesh B.S. sieve.

27. A surgical cement pack according to claim 21, in which the poly(carboxylic acid) is polyacrylic acid.

28. A process for the preparation of a surgical cement which comprises mixing a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0 with a surgically acceptable water soluble poly(carboxylic acid) having a relative viscosity as hereinbefore defined of from 1.05 to 2.00, in the presence of water, to give a mass that remains plastic long enough to be formed into a desired shape prior to hardening as a surgical cement.

29. A process according to claim 28, in which the poly(carboxylic acid) is in the form of an aqueous solution containing from 20 to 60% by weight of the poly(carboxylic acid).

30. A process according to claim 29, in which the poly(carboxylic acid) solution contains from 40 to 55% by weight of the poly(carboxylic acid).

31. A process according to claim 28, in which the poly(carboxylic acid) has a relative viscosity as hereinbefore defined from 1.10 to 1.60.

32. A process according to claim 29, in which the glass powder/liquid ratio is in the range of 0.5:1 to 5:1.

33. A process according to claim 28, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 160–190 |
| Total metal fluorides calculated as fluorine | 105–150 |
| $AlF_3$ | 0–100 |
| $AlPO_4$ | 0–125 |
| $Na_3AlF_6$ | 0–150 |

34. A process according to claim 28, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 75–100 |
| Total metal fluorides calculated as fluorine | 50–150 |
| $AlF_3$ | 0–100 |
| $AlPO_4$ | 0–125 |
| $Na_3AlF_6$ | 50–100 |

35. A process according to claim 28, in which the degree of fineness of the glass powder is such that it passes through a 150 mesh B.S. sieve.

36. A process according to claim 28, in which the poly(carboxylic acid) is polyacrylic acid.

37. The process according to claim 28, in which from 15 to 85% by weight of the fluoroaluminosilicate glass powder, from 3 to 50% by weight of the poly(carboxylic acid) and from 5 to 70% by weight of water, based on the total weight of the components, are mixed to form said surgical cement.

38. A surgical cement, particularly for dental purposes, which has been prepared by reacting a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0 with a poly(carboxylic acid) having a relative viscosity as hereinbefore defined of from 1.05 to 2.00, in the presence of water.

39. The surgical cement according to claim 38, in which from 15 to 85% by weight of the fluoroaluminosilicate glass powder, from 3 to 50% by weight of the poly(carboxylic acid) and from 5 to 70% by weight of water, based on the total weight of the components, are mixed to form said surgical cement.

40. The surgical cement according to claim 39, in which the poly(carboxylic acid) is in the form of an aqueous solution containing from 20 to 60% by weight of the poly(carboxylic acid).

41. The surgical cement according to claim 40, in which the poly(carboxylic acid) solution contains from 40 to 55% by weight of the poly(carboxylic acid).

42. The surgical cement according to claim 38, in which the poly(carboxylic acid) has a relative viscosity as hereinbefore defined from 1.10 to 1.60.

43. The surgical cement according to claim 39, in which the glass powder/liquid ratio is in the range of 0.5:1 to 5:1.

44. The surgical cement according to claim 38, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 160–190 |
| Total metal fluorides calculated as fluorine | 105–150 |
| $AlF_3$ | 0–100 |
| $AlPO_4$ | 0–125 |
| $Na_3AlF_6$ | 0–150 |

45. The surgical cement according to claim 38, in which the fluoroaluminosilicate glass has been prepared by fusing a mixture having the following composition expressed as parts per 100 parts of alumina ($Al_2O_3$):

| | |
|---|---|
| $Al_2O_3$ | 100 |
| $SiO_2$ | 75–100 |
| Total metal fluorides calculated as fluorine | 50–150 |
| $AlF_3$ | 0–100 |
| $AlPO_4$ | 0–125 |
| $Na_3AlF_6$ | 50–100 |

46. The surgical cement according to claim 38, in which the degree of fineness of the glass powder is such that it passes through a 150 mesh B.S. sieve.

47. The surgical cement according to claim 38, in which the poly(carboxylic acid) is polyacrylic acid.

(References on following page)

References Cited

UNITED STATES PATENTS

| | | |
|---|---|---|
| 3,655,605 | 4/1972 | Smith. |
| 3,336,669 | 8/1967 | Kramer ———————— 32—15 |

FOREIGN PATENTS

| | | |
|---|---|---|
| 966,278 | 7/1957 | Germany. |
| 1,001,374 | 8/1965 | Great Britain. |

OTHER REFERENCES

Skinner: *J. Am. Dent. Assoc.*, 58, 27–28 (1959).

Paffenbarger et al.: *J. Am. Dent. Ass'n*, 25, 32–41 (1938).

MELVIN GOLDSTEIN, Primary Examiner

U.S. Cl. X.R.

32—15; 106—35; 260—41 A